(12) United States Patent
Tateishi

(10) Patent No.: US 10,284,087 B2
(45) Date of Patent: May 7, 2019

(54) STEP-UP/STEP-DOWN DC-DC CONVERTER

(71) Applicant: Rohm Co., Ltd., Kyoto (JP)

(72) Inventor: Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 14 days.

(21) Appl. No.: 15/735,470

(22) PCT Filed: May 20, 2016

(86) PCT No.: PCT/JP2016/064954
§ 371 (c)(1),
(2) Date: Dec. 11, 2017

(87) PCT Pub. No.: WO2016/203900
PCT Pub. Date: Dec. 22, 2016

(65) Prior Publication Data
US 2018/0166991 A1    Jun. 14, 2018

(30) Foreign Application Priority Data

Jun. 16, 2015  (JP) .................................. 2015-121194

(51) Int. Cl.
H02M 3/158    (2006.01)
H02M 1/088    (2006.01)
H02M 3/157    (2006.01)

(52) U.S. Cl.
CPC .......... *H02M 3/158* (2013.01); *H02M 1/088* (2013.01); *H02M 3/157* (2013.01); *H02M 3/1582* (2013.01)

(58) Field of Classification Search
CPC .... H02M 3/155–3/158; H02M 3/1584; H02M 3/1588; H02M 2001/0032; Y02B 70/126; Y02B 70/1466

USPC ................. 323/222, 224, 271, 280, 282–285
See application file for complete search history.

(56) References Cited

U.S. PATENT DOCUMENTS

| | | | |
|---|---|---|---|
| 6,166,527 A * | 12/2000 | Dwelley | H02M 3/1582 323/222 |
| 7,518,346 B2 | 4/2009 | Prexl et al. | |
| 8,860,393 B2 * | 10/2014 | Kronmueller | G05F 1/595 323/283 |
| 2008/0174286 A1 * | 7/2008 | Chu | H02M 3/1588 323/271 |

(Continued)

FOREIGN PATENT DOCUMENTS

| JP | 2009-077538 | 4/2009 |
|---|---|---|
| JP | 2015-053833 | 3/2015 |

OTHER PUBLICATIONS

Japan Patent Office; International Search Report for PCT/JP2016064954 dated Aug. 9, 2016 (with English translation).

*Primary Examiner* — Yemane Mehari
(74) *Attorney, Agent, or Firm* — Fish & Richardson P.C.

(57) ABSTRACT

In the present invention a switching control circuit 130 has: a slope voltage generation unit 131 that generates slope voltages Vs1 and Vs2 that are opposite in phase and intersect each other; comparators 132 and 133 that respectively compare the slope voltages Vs1 and Vs2 and a control voltage Vc, and generate comparison signals S1 and S2; and a logical operation unit 134 that generates a step-down control signal D0 and a step-up control signal U0 from the comparison signals S1 and S2. The step-down control signal D0 and the step-up control signal U0 are used to control the switching of a step-up/step-down DC/DC converter.

8 Claims, 20 Drawing Sheets

(56) References Cited

U.S. PATENT DOCUMENTS

2014/0266084 A1\* 9/2014 Fan ..................... H02M 3/156
        323/222
2015/0069986 A1\* 3/2015 Yanagida ............ H02M 3/1582
        323/271

\* cited by examiner

STEP-UP/STEP-DOWN DC-DC CONVERTER

TECHNICAL FIELD

The present invention relates to step-up/step-down DC-DC converters.

BACKGROUND ART

Conventionally, step-up/step-down DC-DC converters that generate a desired output voltage by stepping up or down an input voltage have been widely and commonly used.

One example of conventional technology related to the above description can be found in Patent Document 1.

LIST OF CITATIONS

Patent Literature

Patent Document 1: U.S. Pat. No. 6,166,527
Patent Document 2: U.S. Pat. No. 7,518,346

SUMMARY OF THE INVENTION

Technical Problem

A step-up/step-down DC-DC converter typically requires four switching devices as circuit components that form the switching output stage. In conventional step-down/step-up DC-DC converters, these four switching devices are switched every cycle, and this leads to a large switching loss and inefficiency.

Patent Document 1 proposes step-up/step-down DC-DC converters that can seamlessly switch among three operation modes (step-down, step-up/step-down, and step-up). However, the four switches are still switched every cycle in a region where the potential difference between the input voltage and the output voltage is small, and thus the above-mentioned problem is not completely solved.

Patent Document 2 proposes step-up/step-down DC-DC converters that can seamlessly switch between two operation modes (step-down and step-up) by minimizing the gap between the two operation modes by use of a step-up ramp signal and a step-down ramp signal. However, it is not quite easy to completely eliminate the gap, and the proposed design is thus difficult to put into practical application.

To cope with the above-mentioned problems encountered by the present inventor, the present invention aims to provide a step-up/step-down DC-DC converter that seamlessly switches between step-down operation and step-up operation and to provide a switching control circuit used in such a step-up/step-down DC-DC converter.

Means for Solving the Problem

According to one aspect of what is disclosed herein, a switching control circuit includes: a slope voltage generator configured to generate a first slope voltage and a second slope voltage that have opposite phases and that cross each other, a first comparator configured to generate a first comparison signal by comparing the first slope voltage with a control voltage; a second comparator configured to generate a second comparison signal by comparing the second slope voltage with the control voltage; and a logic operator configured to generate a step-down control signal and a step-up control signal based on the first comparison signal and the second comparison signal. The switching control circuit is configured to control switching of a step-up/step-down DC-DC converter by use of the step-down control signal and the step-up control signal (a first configuration).

In the switching control circuit according to the first configuration, the logic operator may be configured to receive the first comparison signal and the second comparison signal, extract a state where the control voltage is lower than both of the first slope voltage and the second slope voltage and a state where the control voltage is higher than both of the first slope voltage and the second slope voltage, and generate the step-down control signal based on one extraction result and the step-up control signal based on the other extraction result (a second configuration).

In the switching control circuit according to the first or second configuration, the first slope voltage and the second slope voltage may both be voltage signals having triangular waveforms, sawtooth waveforms, or any other similar slope waveforms (a third configuration).

In the switching control circuit according to the third configuration, the slope voltage generator may include: a first current source connected between a first power terminal and an output terminal from which the first slope voltage is output; a first capacitor connected between an output terminal from which the first slope voltage is output and a second power terminal; a second capacitor connected between a third power terminal and an output terminal from which the second slope voltage is output; a second current source connected between an output terminal from which the second slope voltage is output and the second power terminal; a comparator configured to generate a reset signal by comparing the first slope voltage with a voltage applied to the third power terminal; a first discharge switch configured to discharge the first capacitor according to the reset signal; and a second discharge switch configured to discharge the second capacitor according to the reset signal (a fourth configuration).

In the switching control circuit according to the fourth configuration, the logic operator may be configured, when the first capacitor and the second capacitor are discharged, to hold the logic levels of the step-down control signal and the step-up control signal irrespective of the first comparison signal and the second comparison signal (a fifth configuration).

In the switching control circuit according to the fifth configuration, the slope voltage generator may further include a masking processor configured to generate a blank signal having a predetermined pulse width when triggered by a pulse edge in the reset signal, and the logic operator may be configured to hold the logic levels of the step-down control signal and the step-up control signal according to the blank signal (a sixth configuration).

According to another aspect of what is disclosed herein, a step-up/step-down DC-DC converter includes: a switching output circuit configured to generate an output voltage from an input voltage by use of a switching device; a control voltage generation circuit configured to receive the output voltage to generate a control voltage; the switching control circuit according to any one of the first to fifth configurations configured to receive the control voltage to generate a step-down control signal and a step-up control signal; and a switching drive circuit configured to receive the step-down control signal and the step-up control signal to drive the switching device (a seventh configuration).

In the step-up/step-down DC-DC converter according to the seventh configuration, the switching output circuit may include: a first switching device of which a first terminal is connected to an input terminal to which the input voltage is input; a second switching device of which a first terminal is connected to a second terminal of the first switching device and of which a second terminal is connected to a ground terminal; a coil of which a first terminal is connected to a connection node between the second terminal of the first switching device and the first terminal of the second switching device; a third switching device of which a first terminal is connected to a second terminal of the coil and of which a second terminal is connected to the ground terminal; a fourth switching device of which a first terminal is connected to the second terminal of the coil and of which a second terminal is connected to an output terminal from which the output voltage is output; and a capacitor of which a first terminal is connected to the output terminal from which the output voltage is output and of which a second terminal is connected to the ground terminal (an eighth configuration).

In the step-up/step-down DC-DC converter according to the seventh or eighth configuration, the control voltage generation circuit may include an error amplifier configured to generate the control voltage according to the difference between the output voltage or a feedback voltage commensurate with the output voltage and a predetermined reference voltage (a ninth configuration).

According to yet another aspect of what is disclosed herein, an electronic device includes the step-up/step-down DC-DC converter according to any one of the seventh to ninth configurations (a tenth configuration).

Advantageous Effects of the Invention

According to the present invention disclosed herein, it is possible to provide a step-up/step-down DC-DC converter that seamlessly switches between step-down operation and step-up operation.

DESCRIPTION OF EMBODIMENTS

<Step-Up/Step-Down DC-DC Converter>

Figure 1:
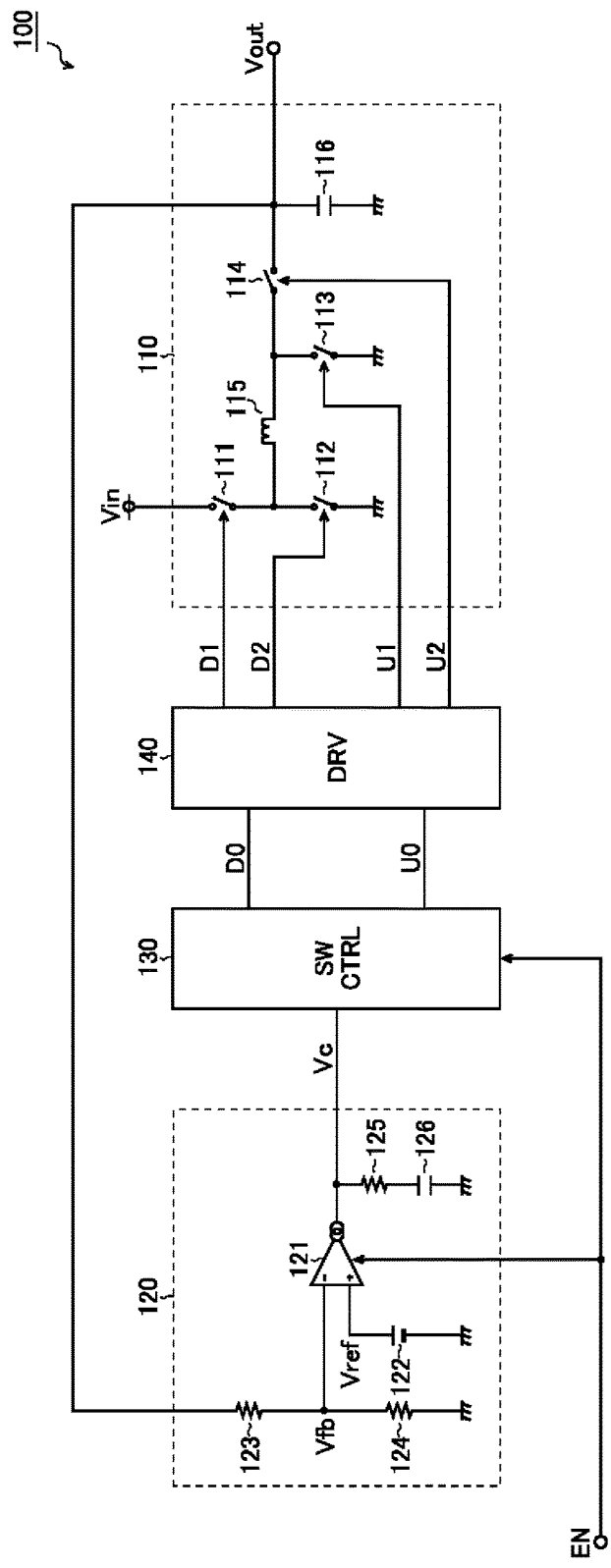
FIG. 1 is a circuit diagram showing one configuration example of a step-up/step-down DC-DC converter.

FIG. 1 is a circuit diagram showing one configuration example of a step-up/step-down DC-DC converter 100. The step-up/step-down DC-DC converter 100 according to the configuration example is a switching regulator of a voltage mode control type including a switching output circuit 110, a control voltage generation circuit 120, a switching control circuit 130, and a switching drive circuit 140.

The switching output circuit 110 includes switching devices 111 to 114, a coil 115, and a capacitor 116, and generates a desired output voltage Vout by stepping down or up an input voltage Vin. As the switching devices 111 to 114 respectively, MOSFETs (metal-oxide-semiconductor field-effect transistors), IGBTs (insulated-gate bipolar transistors), or the like can be suitably used.

A first terminal of the switching device 111 is connected to an input terminal to which the input voltage Vin is input. A second terminal of the switching device 111 is connected to a first terminal of the switching device 112 and to a first terminal of the coil 115. A second terminal of the switching device 112 is connected to a ground terminal. A second terminal of the coil 115 is connected to a first terminal of the switching device 113 and to a first terminal of the switching device 114. A second terminal of the switching device 113 is connected to a ground terminal. A second terminal of the switching device 114 is connected to an output terminal from which the output voltage Vout is output and to a first terminal of the capacitor 116. A second terminal of the capacitor 116 is connected to a ground terminal.

The switching device 111 is ON when a step-down drive signal D1 is at high level, and is OFF when the step-down drive signal D1 is at low level. The switching device 112 is ON when a step-down drive signal D2 is at high level, and is OFF when the step-down drive signal D2 is at low level. The switching device 113 is ON when a step-up drive signal U1 is at high level, and is OFF when the step-up drive signal U2 is at low level. The switching device 114 is ON when a step-up drive signal U2 is at high level, and is OFF when the step-up drive signal U2 is at low level.

The control voltage generation circuit 120 includes an error amplifier 121, a voltage source 122, resistors 123 to 125, and a capacitor 126, and receives the output voltage Vout to generate a control voltage Vc.

The error amplifier 121 generates the control voltage (error voltage) Vc by charging and discharging the capacitor 126 according to the difference between a feedback voltage Vfb, which is fed to the inverting input terminal (−) of the error amplifier 121, and a reference voltage Vref, which is fed to the non-inverting input terminal (+) of the error amplifier 121. The control voltage Vc increases when the feedback voltage Vfb is lower than the reference voltage Vref, and decreases when the feedback voltage Vfb is higher than the reference voltage Vref. The error amplifier 121 has a function to switch its operation state (between an enabled and a disabled state) according to an enable signal EN.

The voltage source 122 is connected between the non-inverting input terminal (+) of the error amplifier 121 and a ground terminal, and generates a predetermined reference voltage Vref. As the voltage source 122, a bandgap circuit or the like with low power supply dependence and low temperature dependence can be suitably used.

The resistors 123 and 124 are connected in series between the output terminal from which the output voltage Vout is output and a ground terminal, and output, from the connection node between them, the feedback voltage Vfb (corresponding to a division voltage of the output voltage Vout). When the output voltage Vout is within the input dynamic range of the error amplifier 121, instead of the resistors 123 and 124 being provided, the output voltage Vout may be directly fed to the inverting input terminal (−) of the error amplifier 121.

The resistor 125 and the capacitor 126 are connected between an output terminal of the error amplifier 121 and a ground terminal, and serve, by phase compensation, to prevent the control voltage Vc from oscillating.

The switching control circuit 130 receives the control voltage Vc to generate a step-down control signal D0 and a step-up control signal U0, and by use of these signals, controls the switching of the step-up/step-down DC-DC converter 100. The step-down control signal D0 and the step-up control signal U0 are each a PWM (pulse width modulation) signal of which the pulse width is modulated according to the control voltage Vc. The switching control circuit 130 has a function to switch its operation state (between an enabled state and a disabled state) according to the enable signal EN.

The switching drive circuit 140 receives the step-down control signal D0 and the step-up control signal U0 to generate step-down drive signals D1 and D2 and step-up drive signals U1 and U2, and by use of these signals, turns ON and OFF the switching devices 111 to 114.

Figure 2:
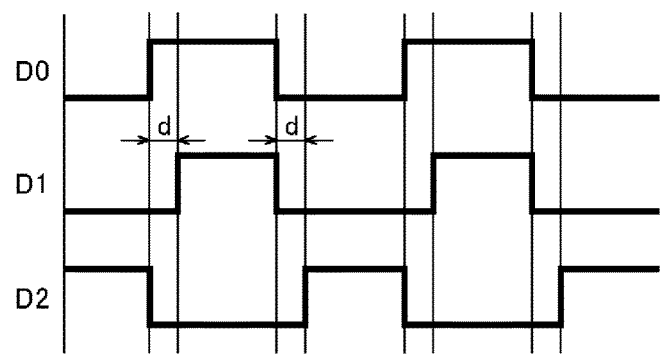
FIG. 2 is a timing chart showing the operation of generating a step-down drive signal.

FIG. 2 is a timing chart showing the operation of generating the step-down drive signals D1 and D2, depicting the step-down control signal D0 and the step-down drive signals D1 and D2.

The step-down drive signal D1 turns to high level at the lapse of a delay time d from a rising edge in the step-down control signal D0, and turns to low level simultaneously with a falling edge in the step-down control signal D0. In contrast, the step-down drive signal D2 turns to low level simultaneously with a rising edge in the step-down control signal D0, and turns to high level at the lapse of the delay time d from a falling edge in the step-down control signal D0.

As a result, the step-down drive signals D1 and D2 basically behave such that when one of them is at high level, the other is at low level. Thus, the switching devices 111 and 112 are turned ON and OFF individually in a complementary manner. Precisely, in the step-down drive signals D1 and D2, there is provided a period (so-called dead time) during which the step-down drive signals D1 and D2 are both at low level for the delay time d. Thus, it is possible to prevent occurrence of a through current due to the switching devices 111 and 112 simultaneously turning ON.

Figure 3:
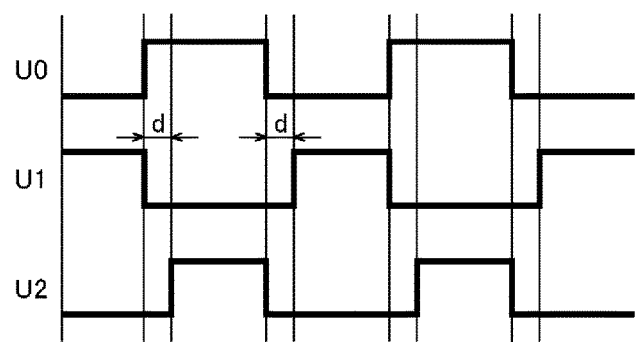
FIG. 3 is a timing chart showing the operation of generating a step-up drive signal.

FIG. 3 is a timing chart showing the operation of generating the step-up drive signals U1 and U2, depicting the step-up control signal U0 and the step-up drive signals U1 and U2.

The step-up drive signal U1 turns to low level simultaneously with a raising edge in the step-up control signal U0, and turns to high level at the lapse of the delay period d from a falling edge in the step-up control signal U0. In contrast, the step-up drive signal U2 turns to high level at the lapse of the delay time d from a raising edge in the step-up control signal U0, and turns to low level simultaneously with a falling edge in the step-up control signal U0.

As a result, the step-up drive signals U1 and U2 basically behave such that when one of them is at high level, the other is at low level. Thus, the switching devices 113 and 114 are turned ON and OFF individually in a complementary manner. Precisely, in the step-up drive signals U1 and U2, there is provided a period (so-called dead time) during which the step-up drive signals U1 and U2 are both at low level for the delay period d. Thus, it is possible to prevent occurrence of a through current due to the switching devices 113 and 114 turning simultaneously ON.

Switching Controller (First Embodiment)

Figure 4:
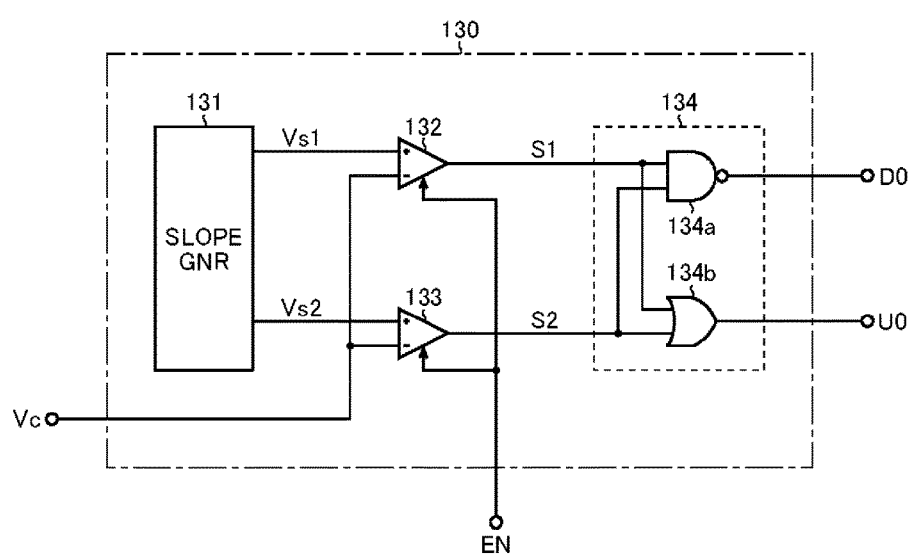
FIG. 4 is a block diagram showing a switching controller according to a first embodiment.

FIG. 4 is a block diagram showing a switching controller 130 according to a first embodiment. The switching controller 130 according to this embodiment includes a slope voltage generator 131, comparators 132 and 133, and a logic operator 134.

The slope voltage generator 131 generates slope voltages Vs1 and Vs2 which cross each other and which have opposite phases. In the switching controller 130 according to this embodiment, it is assumed that the slope voltages Vs1 and Vs2 are voltage signals each with a triangular waveform that have an equal peak value and an equal bottom value and that have completely inverted waveforms relative to each other.

The comparator 132 generates a comparison signal S1 by comparing the slope voltage Vs1, which is fed to the non-inverting input terminal (+) of the comparator 132, with the control voltage Vc, which is fed to the inverting input terminal (−) of the comparator 132. The comparison signal S1 is at high level when the slope voltage Vs1 is higher than the control voltage Vc, and is at low level when the slope voltage Vs1 is lower than the control voltage Vc.

The comparator 133 generates a comparison signal S2 by comparing the slope voltage Vs2, which is fed to the non-inverting input terminal (+) of the comparator 133, with the control voltage Vc, which is fed to the inverting input terminal (−) of the comparator 133. The comparison signal S2 is at high level when the slope voltage Vs2 is higher than the control voltage Vc, and is at low level when the slope voltage Vs2 is lower than the control voltage Vc.

The comparators 132 and 133 each have a function to switch its operation state (between an enabled state and a disabled state) according to the enable signal EN.

The logic operator 134 includes a NAND gate 134a and an OR gate 134b, and receives the comparison signals S1 and S2 to generate a step-down control signal D0 and a step-up control signal U0.

The NAND gate 134a generates the step-down control signal D0 by a NAND operation between the comparison signals S1 and S2. Thus, the step-down control signal D0 is at low level when the comparison signals S1 and S2 are both at high level, and is at high level when at least one of the comparison signals S1 and S2 is at low level.

The OR gate 134b generates the step-up control signal U0 by an OR operation between the comparison signals S1 and S2. Thus, the step-up control signal U0 is at low level when the comparison signals S1 and S2 are both at low level, and is at high level when at least one of the comparison signals S1 and S2 is at high level.

That is, the logic operator 134 receives the comparison signals S1 and S2, and extracts, on one hand, a state where the control voltage Vc is lower than both of the slope voltages Vs1 and Vs2 (S1=S2=H) and, on the other hand, a state where the control voltage Vc is higher than both of the slope voltages Vs1 and Vs2 (S1=S2=L), generating the step-down control signal D0 based on one extraction result and the step-up control signal U0 based on the other extraction result.

Figure 5:
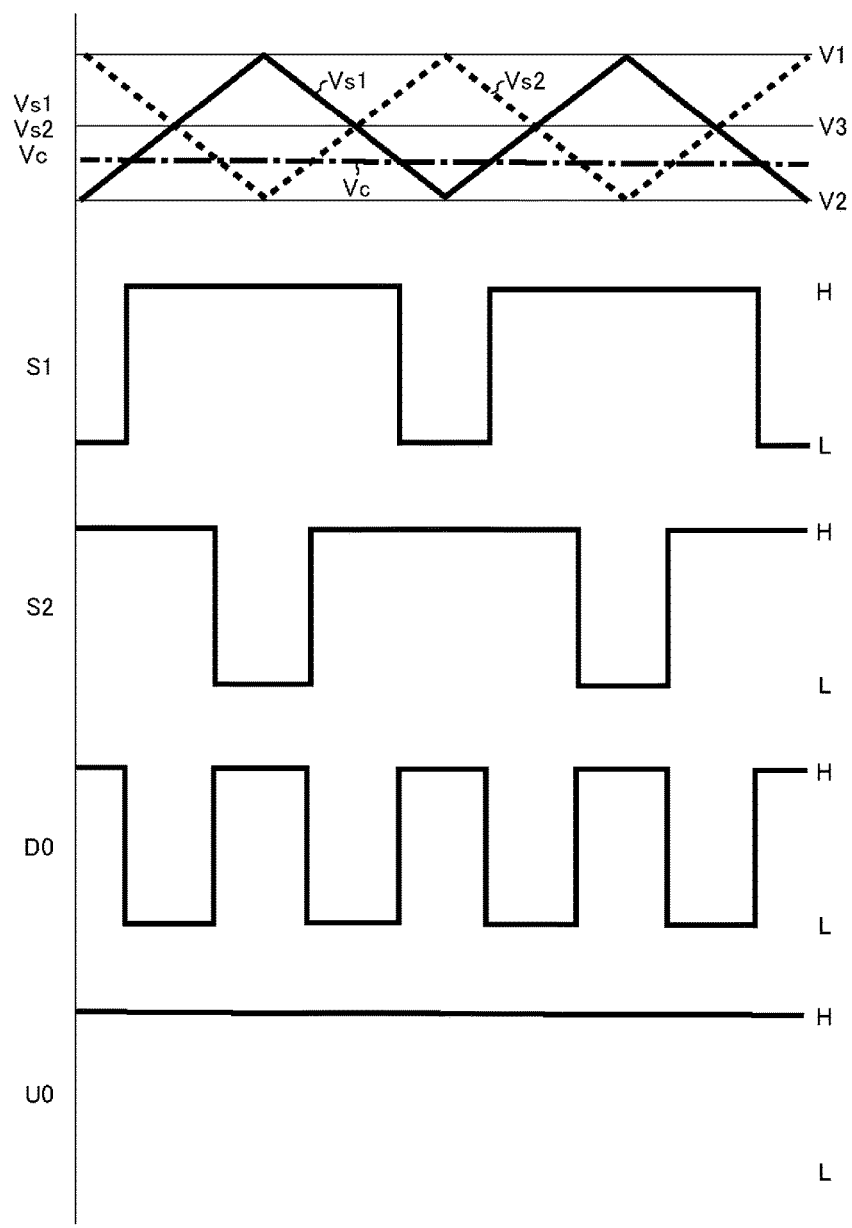
FIG. 5 is a timing chart showing step-down operation in the first embodiment.

FIG. 5 is a timing chart showing one example of step-down operation in the first embodiment, depicting, from top down, the slope voltage Vs1 (solid line), the slope voltage Vs2 (broken line), the control voltage Vc (dash-dot line), the comparison signals S1 and S2, the step-down control signal D0, and the step-up control signal U0.

The slope voltages Vs1 and Vs2 are voltage signals each with a triangular waveform that have an equal peak value V1 and an equal bottom value V2 and that have completely inverted waveforms relative to each other. The slope voltages Vs1 and Vs2 cross each other at their intermediate value V3 ((V1+V2)/2).

Here, when V2≤Vc≤V3, the step-up control signal U0 is constantly at high level, and thus the switching device 113 is constantly OFF, and the switching device 114 is constantly ON. On the other hand, the step-down control signal D0 is in a state pulse-driven at a duty factor (the proportion of the high-level period in one cycle) commensurate with the control voltage Vc, and thus the switching devices 111 and 112 are turned ON and OFF in a complementary manner.

When the switching device 111 is ON and when the switching device 112 is OFF, energy is stored in the coil 115. On the other hand, when the switching device 111 is OFF and when the switching device 112 is ON, the energy stored in the coil 115 is discharged. Through repetition of such storing and discharging of energy, the input voltage Vin is stepped down to generate the output voltage Vout.

The duty factor of the step-down control signal D0 changes continuously from zero to one as the control voltage Vc increases. Thus, in step-down operation, it is possible to obtain the output voltage Vout by stepping down the input voltage Vin according to the duty factor of the step-down control signal D0.

Figure 6:
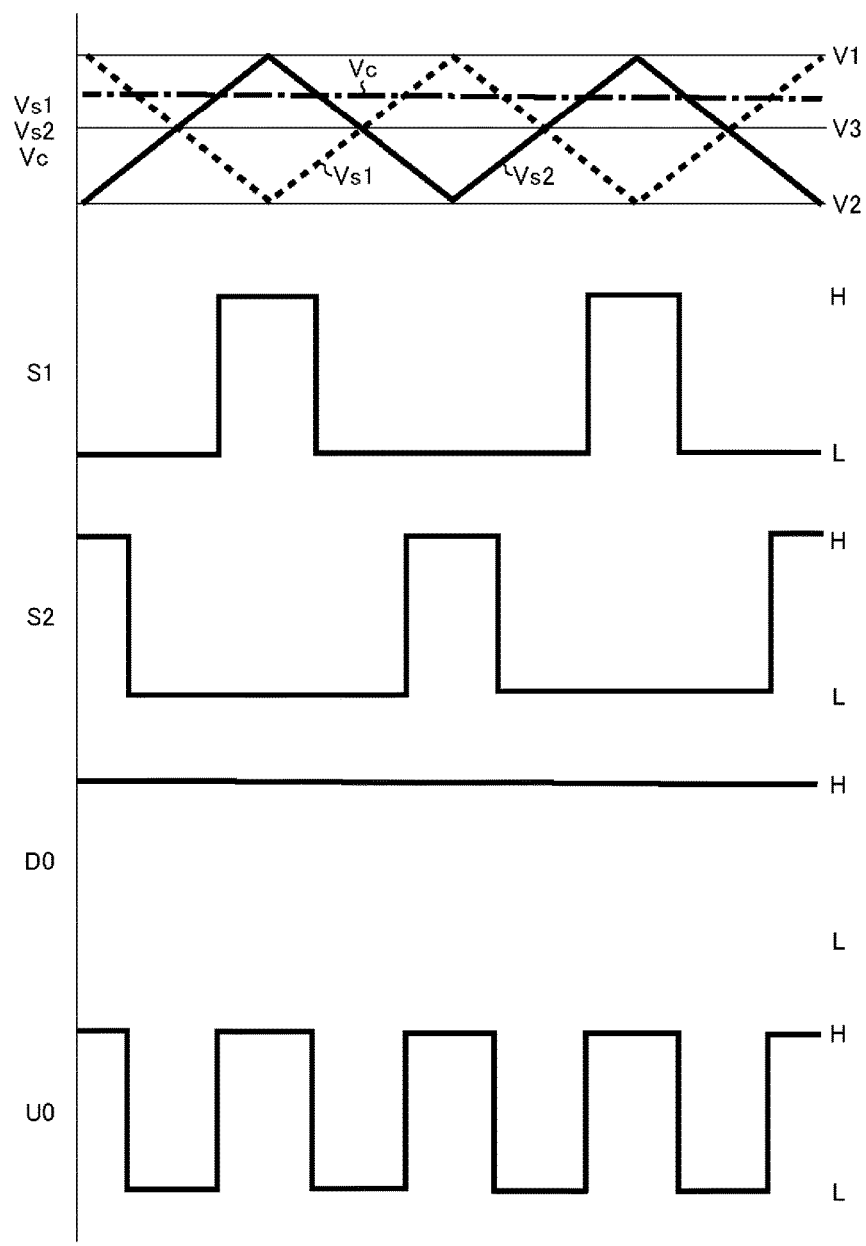
FIG. 6 is a timing chart showing step-up operation in the first embodiment.

FIG. 6 is a timing chart showing one example of step-up operation in the first embodiment, depicting, from top down, the slope voltage Vs1 (solid line), the slope voltage Vs2 (broken line), the control voltage Vc (dash-dot line), the comparison signals S1 and S2, the step-down control signal D0, and the step-up control signal U0.

Like FIG. 5 referred to above, the slope voltages Vs1 and Vs2 are voltage signals each with a triangular waveform that have an equal peak value V1 and an equal bottom value V2 and that have completely inverted waveforms relative to each other. The slope voltages Vs1 and Vs2 cross each other at their intermediate value V3 ((V1+V2)/2).

Here, when V3≤Vc≤V1, the step-down control signal D0 is constantly at high level, and thus the switching device 111 is constantly ON and the switching device 112 is constantly OFF. On the other hand, the step-up control signal U0 is in a state pulse-driven at a duty factor commensurate with the control voltage Vc, and thus the switching devices 113 and 114 are turned ON and OFF in a complementary manner.

When the switching device 113 is ON and when the switching device 114 is OFF, energy is stored in the coil 115. On the other hand, when the switching device 113 is OFF and when the switching device 114 is ON, the energy stored in the coil 115 is discharged. Through repetition of such storing and discharging of energy, the input voltage Vin is stepped down to generate the output voltage Vout.

The duty factor of the step-up control signal U0 changes continuously from one to zero as the control voltage Vc increases. Thus, in step-up operation, it is possible to obtain the output voltage Vout by stepping up the input voltage Vin according to the duty factor of the step-up control signal U0.

FIGS. 7 to 10 are timing charts showing the results of a simulation of open loop operation in the first embodiment (the behavior observed when the control voltage Vc was swept arbitrarily), depicting, from top down, the input voltage Vin (dash-dot line), the output voltage Vout (solid line), the slope voltage Vs1 (solid line), the slope voltage Vs2 (broken line), the control voltage Vc (dash-dot line), the comparison signals S1 and S2, the step-down control signal D0, and the step-up control signal U0.

Figure 7:
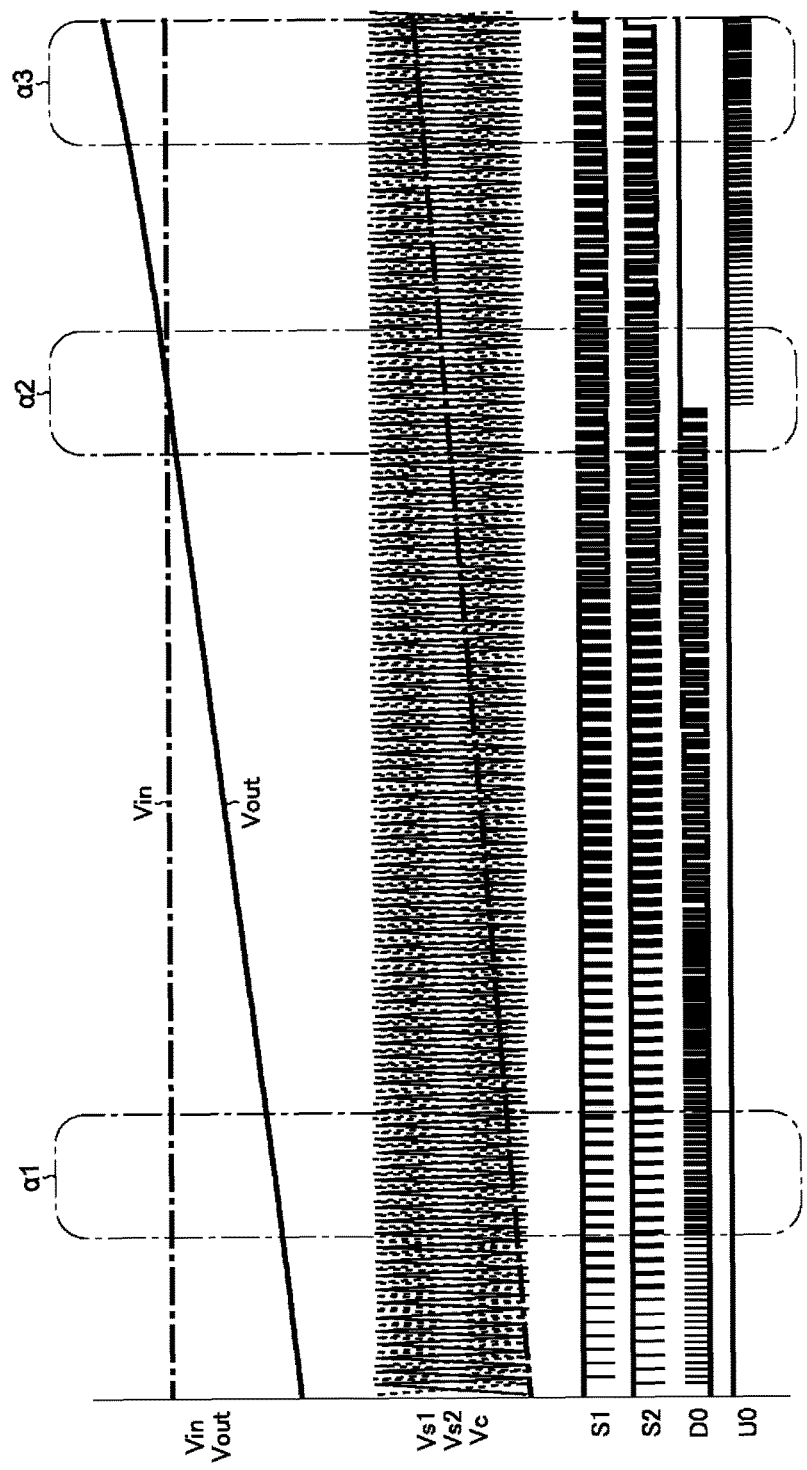
FIG. 7 is a timing chart showing open loop operation (overall operation) in the first embodiment.
Figure 8:
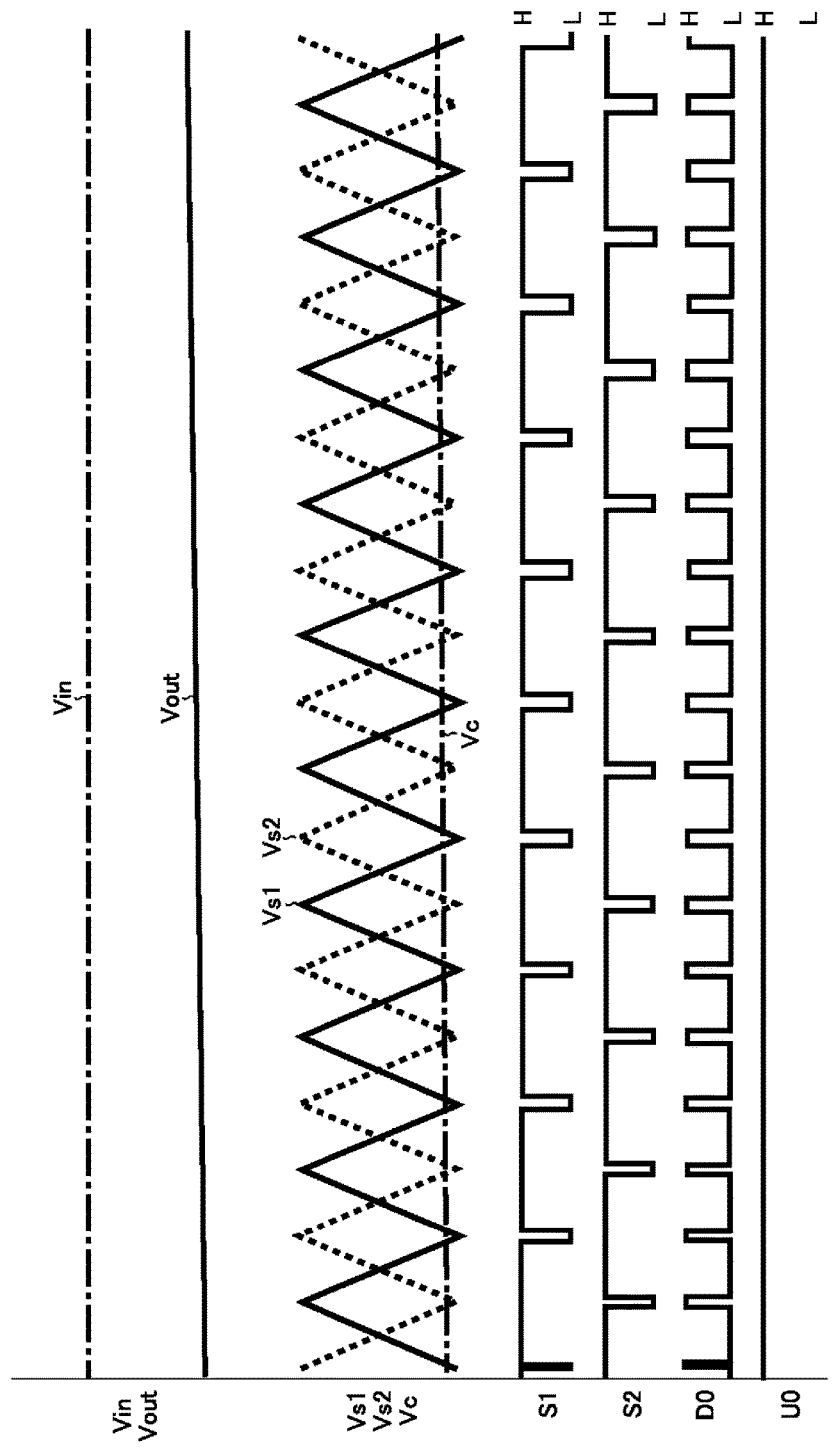
FIG. 8 is a timing chart showing open loop operation (step-down operation) in the first embodiment.
Figure 9:
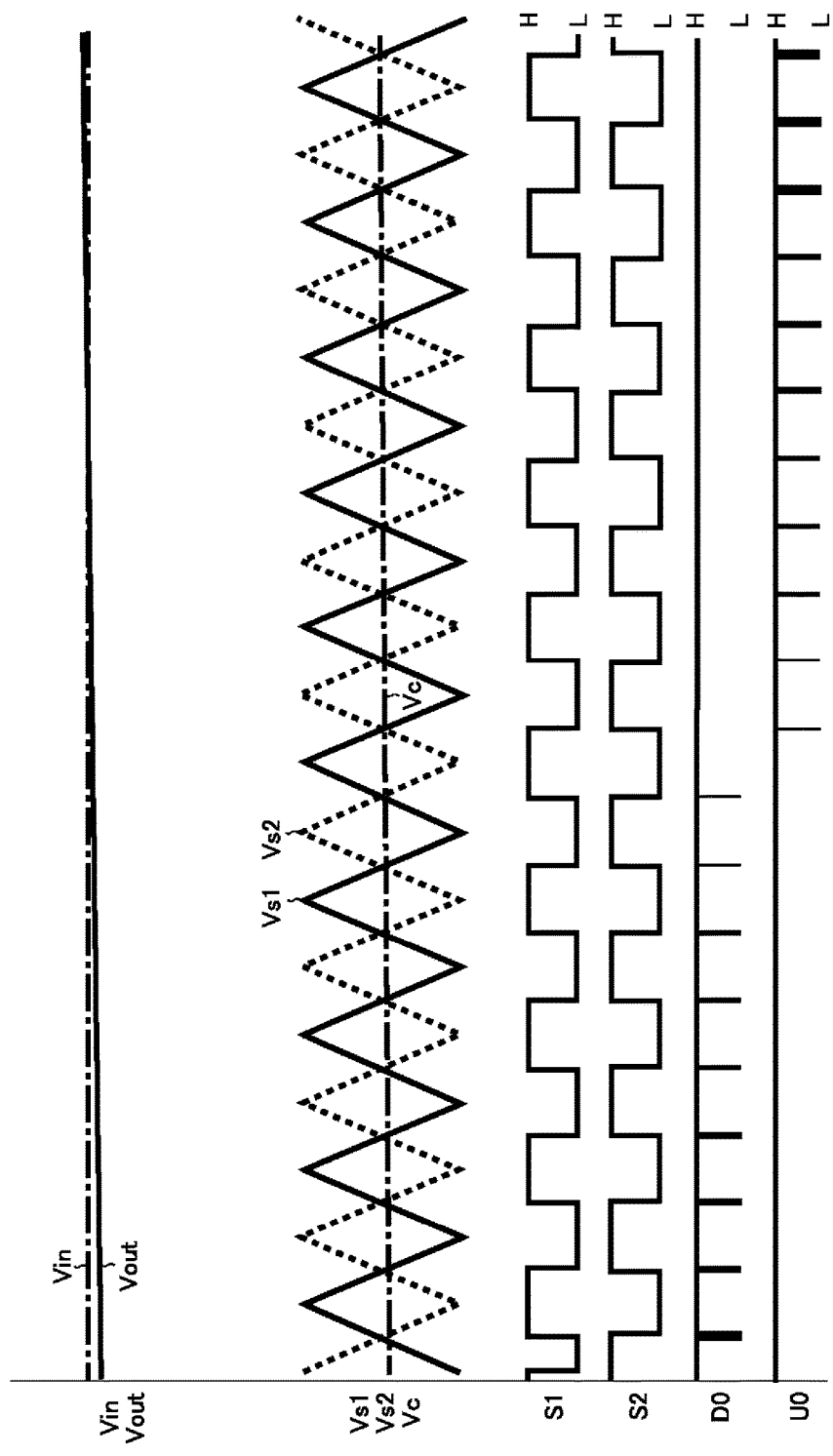
FIG. 9 is a timing chart showing open loop operation (switching operation) in the first embodiment.
Figure 10:
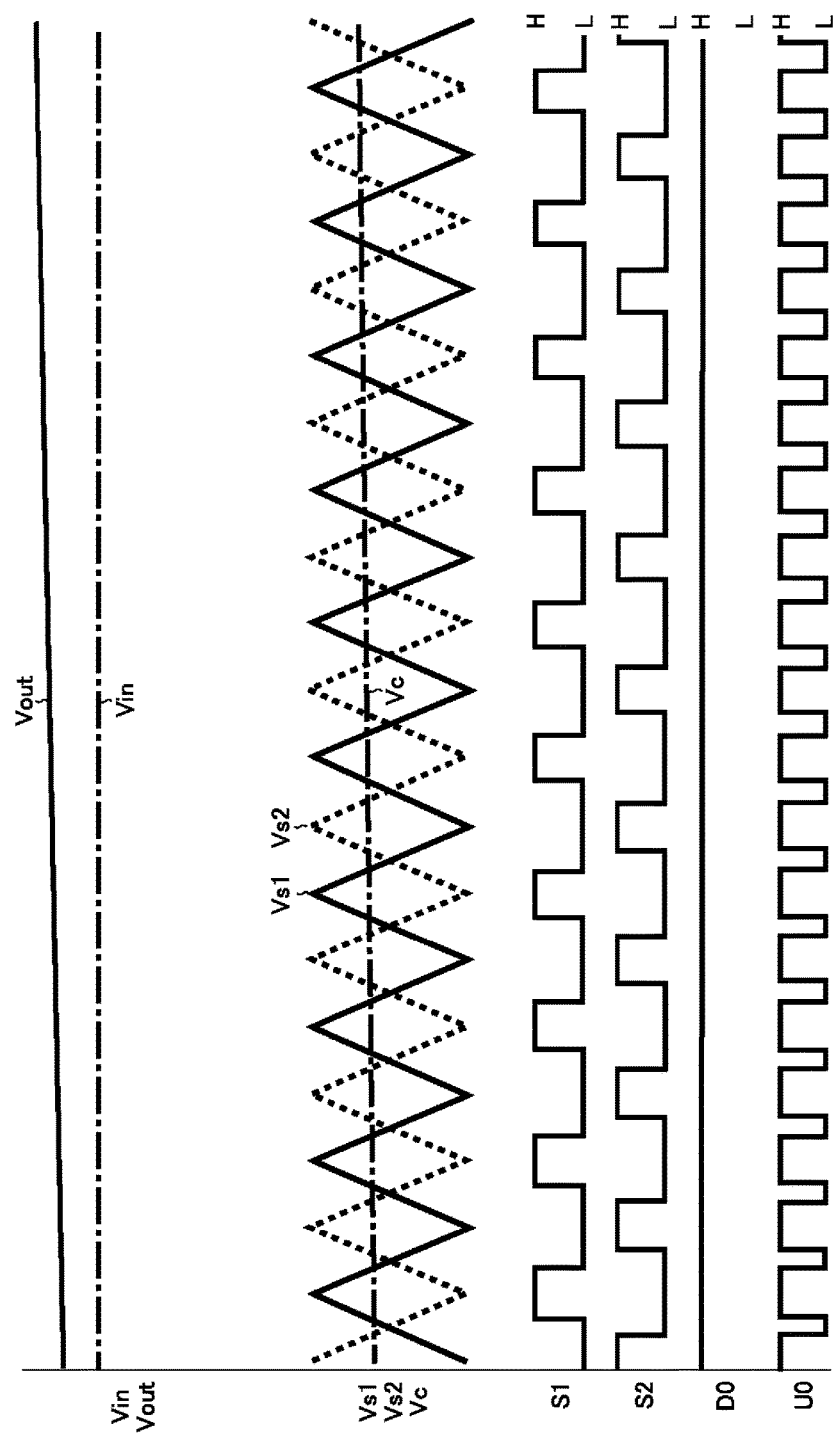
FIG. 10 is a timing chart showing open loop operation (step-up operation) in the first embodiment.

FIGS. 8 to 10 are partly enlarged views corresponding respectively to a region α1 (step-down part), a region α2 (step-up/step-down switch part), and a region α3 (step-up part) in FIG. 7.

As will be understood from FIGS. 7 to 10, as the control voltage Vc is swept, the step-up/step-down DC-DC converter 100 switches seamlessly between step-down operation and step-up operation, and the output voltage Vout monotonically changes.

Because step-down operation and step-up operation switch with each other at the intersection between the slope voltage Vs1 and the slope voltage Vs2, it is possible to achieve perfect switching without an overlap or a gap between the two types of operation.

Figure 11:
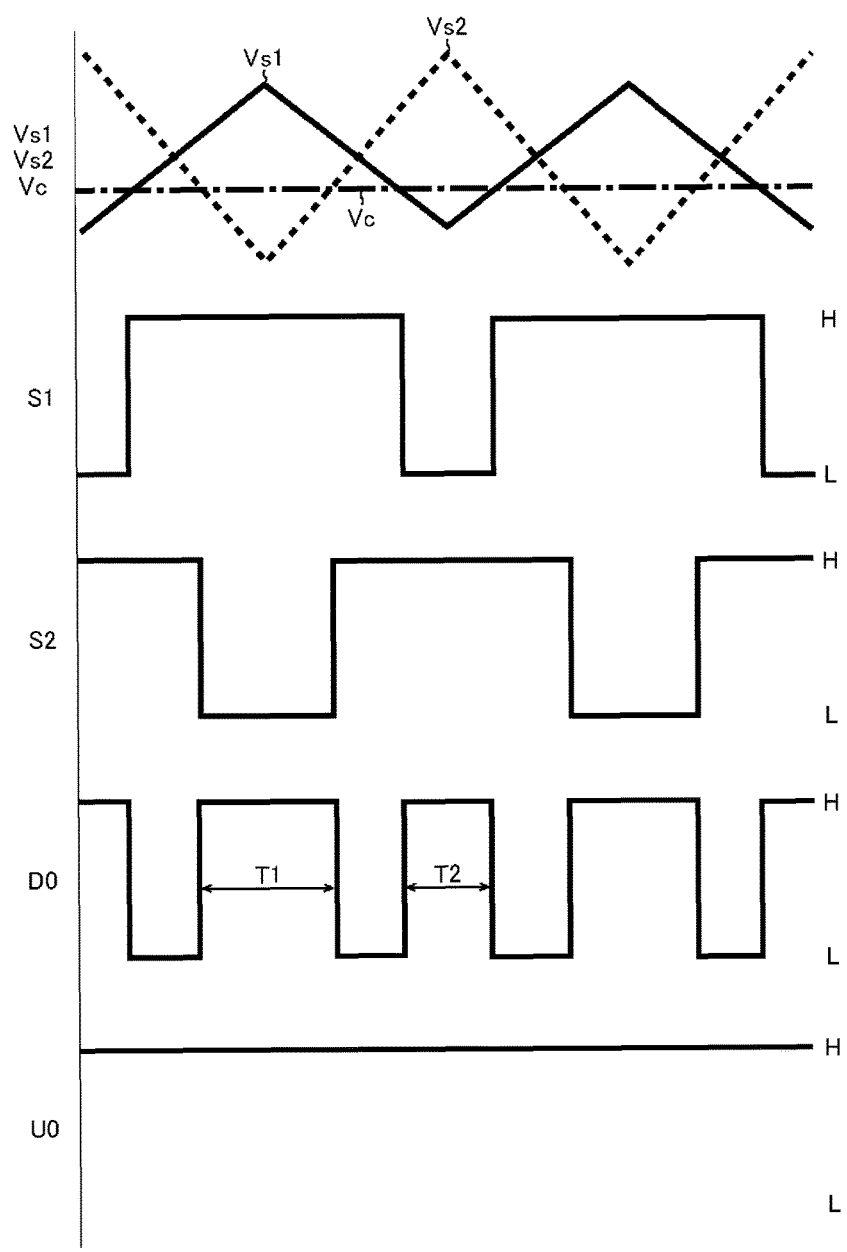
FIG. 11 is a timing chart showing how jitter occurs.

FIG. 11 is a timing chart showing how jitter occurs in the first embodiment, depicting, from top down, the slope voltage Vs1 (solid line), the slope voltage Vs2 (broken line), the control voltage Vc (dash-dot line), the comparison signals S1 and S2, the step-down control signal D0, and the step-up control signal U0.

As shown in FIG. 11, in the switching controller 130 according to the first embodiment, the slope voltages that determine the pulse width of the step-down control signal D0 alternate from one cycle to the next. Thus, if the slope voltages Vs1 and Vs2 have different peak values or different bottom values or if the slope voltages Vs1 and Vs2 do not have completely inverted waveforms related to each other, variation (jitter) may inconveniently occur in the pulse widths T1 and T2 in different cycles.

Although the above description deals with step-down operation as an example, needless to say, step-up operation is not free from similar inconvenience.

Switching Controller (Second Embodiment)

Figure 12:
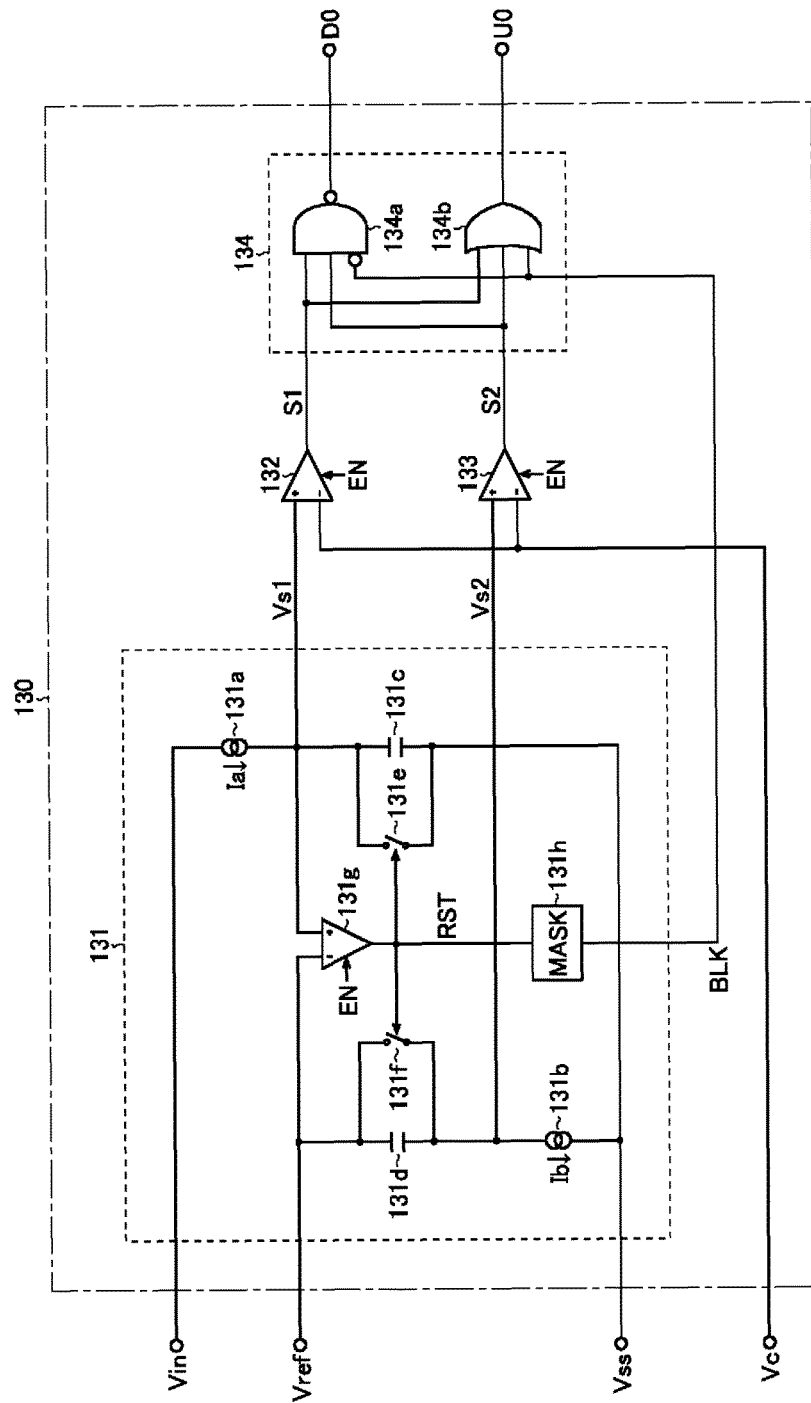
FIG. 12 is a block diagram showing a switching controller according to a second embodiment.

FIG. 12 is a block diagram showing a switching controller 130 according to a second embodiment. The switching controller 130 according to this embodiment, while being based on the above-described first embodiment, is characterized in that the slope voltage generator 131 is more specifically configured for practical application (elimination of jitter). Thus, such components as find their counterparts in the first embodiment are identified by the same reference signs as in FIG. 4, and no overlapping description will be repeated. The following description focuses on features peculiar to the second embodiment.

In the switching controller 130 according to the second embodiment, the slope voltage generator 131 includes current sources 131a and 131b, capacitors 131c and 131d, discharge switches 131e and 131f, a comparator 131g, and a masking processor 131h.

The current source 131a is connected between a terminal to which the input voltage Vin is applied (corresponding to a first power terminal) and an output terminal from which the slope voltage Vs1 is output, and generates a constant current Ia.

The current source 131b is connected between an output terminal from which the slope voltage Vs2 is output and a terminal to which a ground voltage Vss is applied (corresponding to a second power terminal), and generates a constant current Ib (for example Ib=Ia).

The capacitor 131c is connected between an output terminal from which the slope voltage Vs1 is output and a terminal to which the ground voltage Vss is applied.

The capacitor 131d is connected between a terminal to which the reference voltage Vref is applied (corresponding to a third power terminal), and an output terminal from which the slope voltage Vs2 is output.

The discharge switch 131e is connected in parallel with the capacitor 131c, and is turned ON and OFF according to a reset signal RST. More specifically, when the reset signal RST is at high level, the discharge switch 131e is ON to discharge the electric charge stored in the capacitor 131c.

The discharge switch 131f is connected in parallel with the capacitor 131d, and is turned ON and OFF according to the reset signal RST. More specifically, when the reset signal RST is at high level, the discharge switch 131f is ON to discharge the electric charge stored in the capacitor 131d.

The comparator 131g generates the reset signal RST by comparing the slope voltage Vs1, which is fed to the non-inverting input terminal (+) of the comparator 131g, with the reference voltage Vref, which is fed to the inverting input terminal (−) of the comparator 131g. The reset signal RST is at high level when the slope voltage Vs1 is higher than the reference voltage Vref, and is at low level when the slope voltage Vs1 is lower than the reference voltage Vref. The comparator 131g has a function to switch its operation state (between an enabled state and a disabled state) according to the enable signal EN.

The masking processor 131h generates a blank signal BLK having a predetermined pulse width (high-level period) when triggered by a raising edge in the reset signal RST, and outputs the blank signal BLK to the logic operator 134. The pulse width of the blank signal BLK is preferably set appropriately with consideration given to the time taken after the capacitors 131c and 131d are discharged until the logic levels of the comparison signals S1 and S2 are stabilized.

As the slope voltage generator 131 is implemented as described above, the logic operator 134 too is partly modified. Specifically, the blank signal BLK is, after being inverted, fed to the NAND gate 134a, and the blank signal BLK is, as it is, fed to the OR gate 134b.

Thus, when the capacitors 131c and 131d are discharged, as long as the blank signal BLK is at high level, the step-down voltage control signal D0 and the step-up control signal U0 are fixed at high level irrespective of the logic levels of the comparison signals S1 and S2. The technical significance of this operation will be described later.

Figure 13:
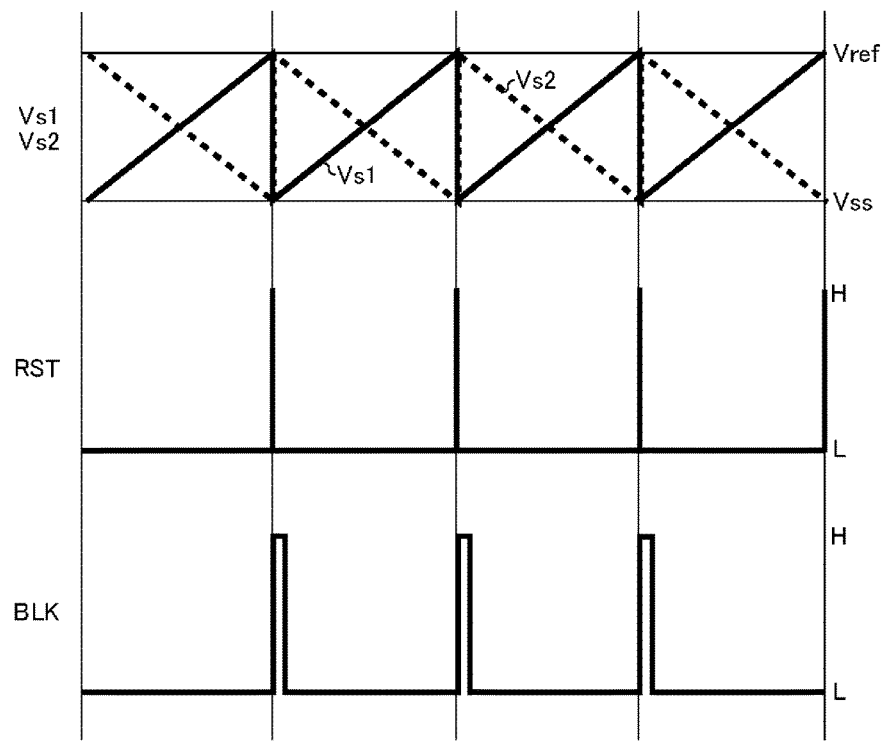
FIG. 13 is a timing chart showing one example of the operation of generating slope voltages.

FIG. 13 is a timing chart showing one example of the operation of generating the slope voltages in the second embodiment, depicting, from top down, the slope voltage Vs1 (solid line), the slope voltage Vs2 (broken line), the reset signal RST, and the blank signal BLK.

During the low-level period of the reset signal RST, the discharge switch 131e is OFF, and the capacitor 131c is charged by the constant current Ia; thus, the slope voltage Vs1 increases gradually from the ground voltage Vss. Then, when the slope voltage Vs1 exceeds the reference voltage Vref, the reset signal RST rises to high level, and the discharge switch 131e turns ON. As a result, the capacitor 131c is short-circuited between its terminals, and thus the slope voltage Vs1 drops down to the ground voltage Vss at once. When, as a result of the capacitor 131c being discharged, the reset signal RST falls back to low level, the discharge switch 131e turns OFF, and the charging of the capacitor 131c is restarted.

During the low-level period of the reset signal RST, the discharge switch 131f is OFF, and the capacitor 131d is charged by the constant current Ib; thus, the slope voltage Vs2 decreases gradually from the reference voltage Vref. Then, when the reset signal RST rises to high level, the discharge switch 131f turns ON, and the capacitor 131d is short-circuited between its terminals, and thus the slope voltage Vs2 is raised to the reference voltage Vref at once.

Thus, in the slope voltage generator 131, as a result of the charging and discharging operation of the capacitors 131c and 131d being repeated in synchronism with the reset signal RST, the oscillation operation of the slope voltages Vs1 and Vs2 continues. Here, the slope voltages Vs1 and Vs2 are voltage signals having sawtooth waveforms with opposite phases.

When the reset signal RST rises to high level, a one-shot pulse is generated in the blank signal BLK. The blank signal BLK functions as a timing control signal for fixing the logic levels of the step-down control signal D0 and the step-up control signal U0 in synchronism with the charging and discharging operation of the capacitors 131c and 131d. Thus, the slope voltage generator 131 functions not only as a means for generating the slope voltages Vs1 and Vs2 but also as a means (clock oscillator) for generating the reset signal RST and the blank signal BLK.

FIGS. 14 to 17 are timing charts showing the results of a simulation of open loop operation in the second embodiment (the behavior observed when the control voltage Vc was swept arbitrarily), depicting, from top down, the input voltage Vin (dash-dot line), the output voltage Vout (solid line), the slope voltage Vs1 (solid line), the slope voltage Vs2 (broken line), the control voltage Vc (dash-dot line), the comparison signals S1 and S2, the step-down control signal D0, the step-up control signal U0, the reset signal RST, and the blank signal BLK.

Figure 14:
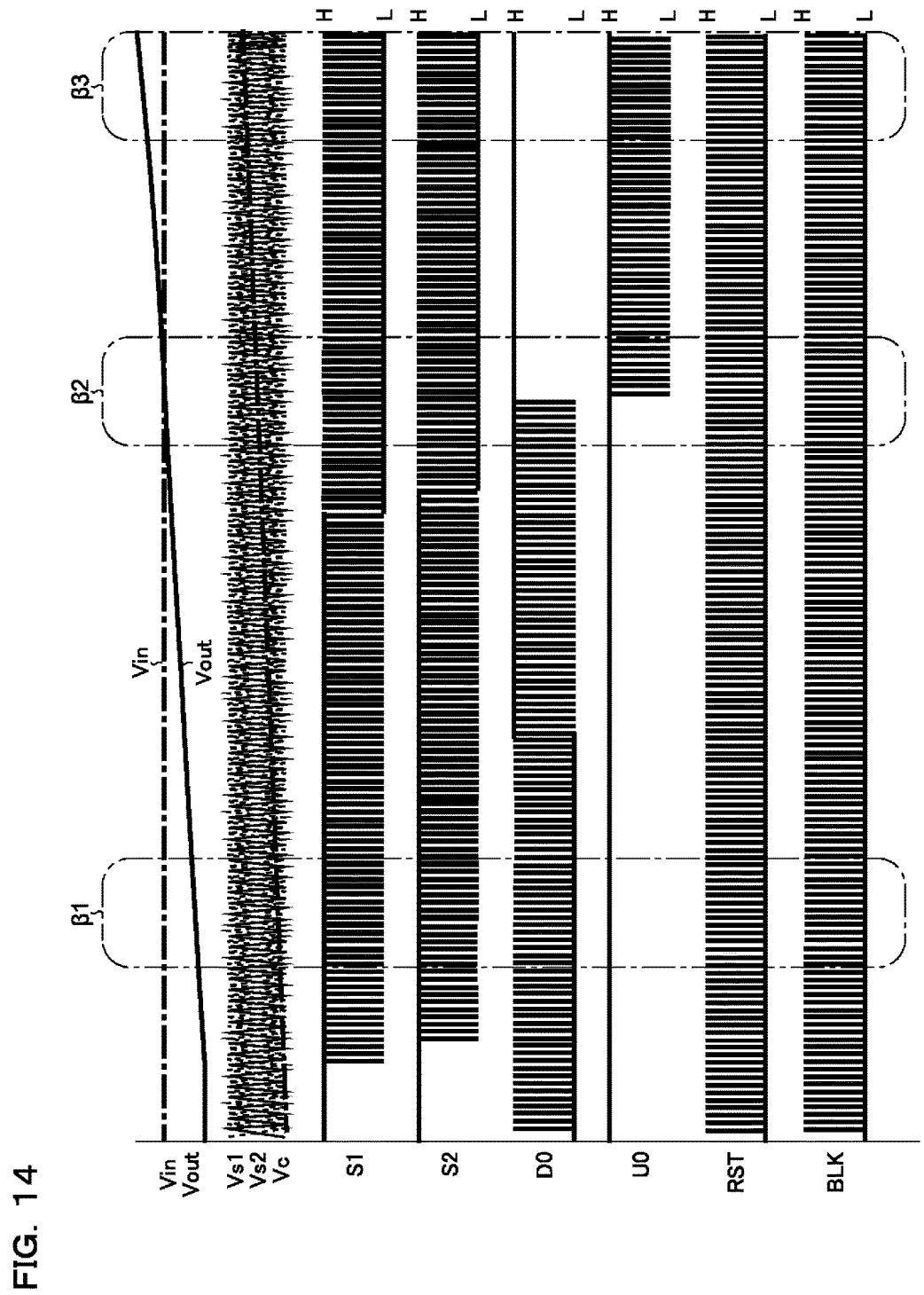
FIG. 14 is a timing chart showing open loop operation (overall operation) in the second embodiment.
Figure 15:
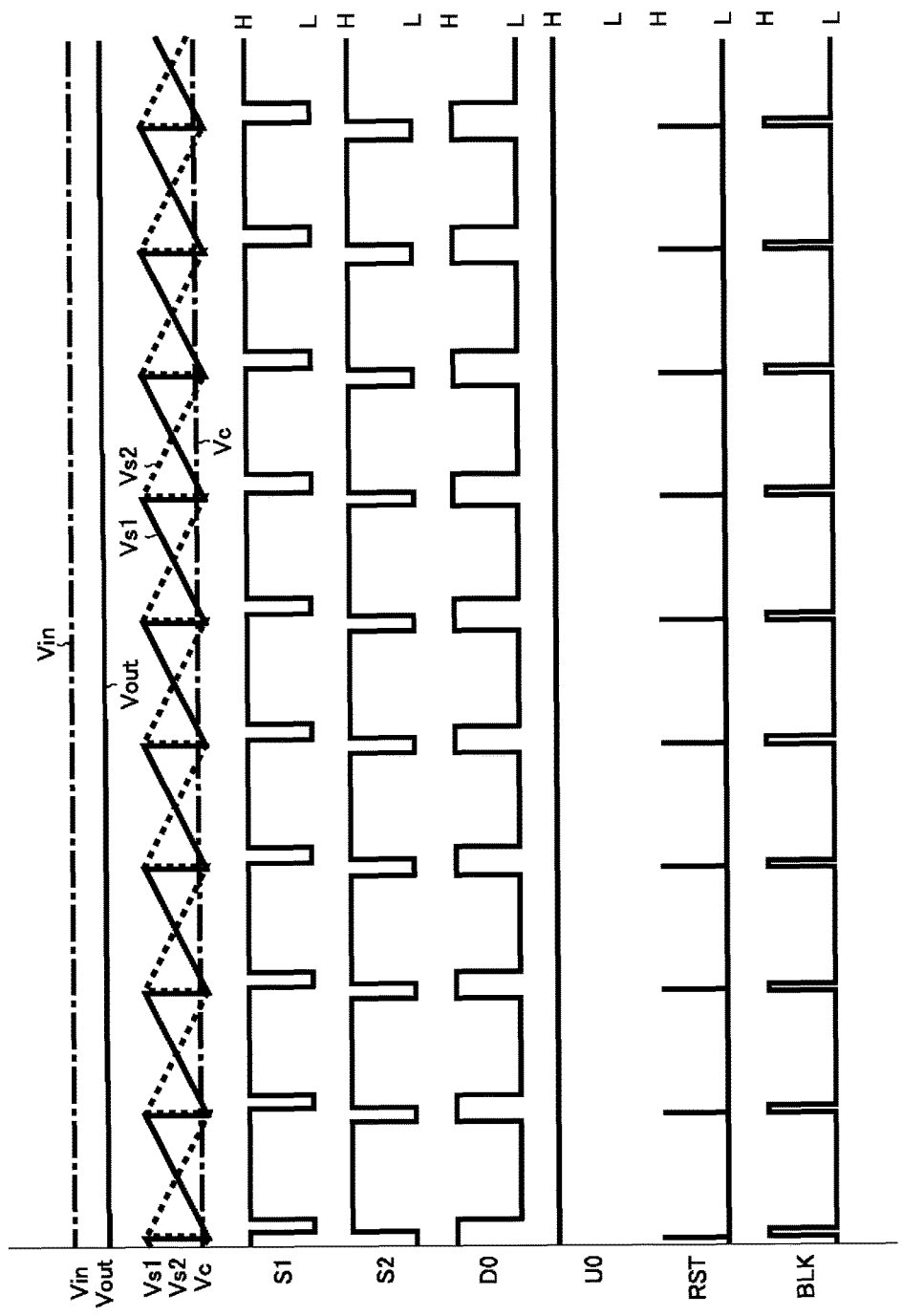
FIG. 15 is a timing chart showing open loop operation (step-down operation) in the second embodiment.
Figure 16:
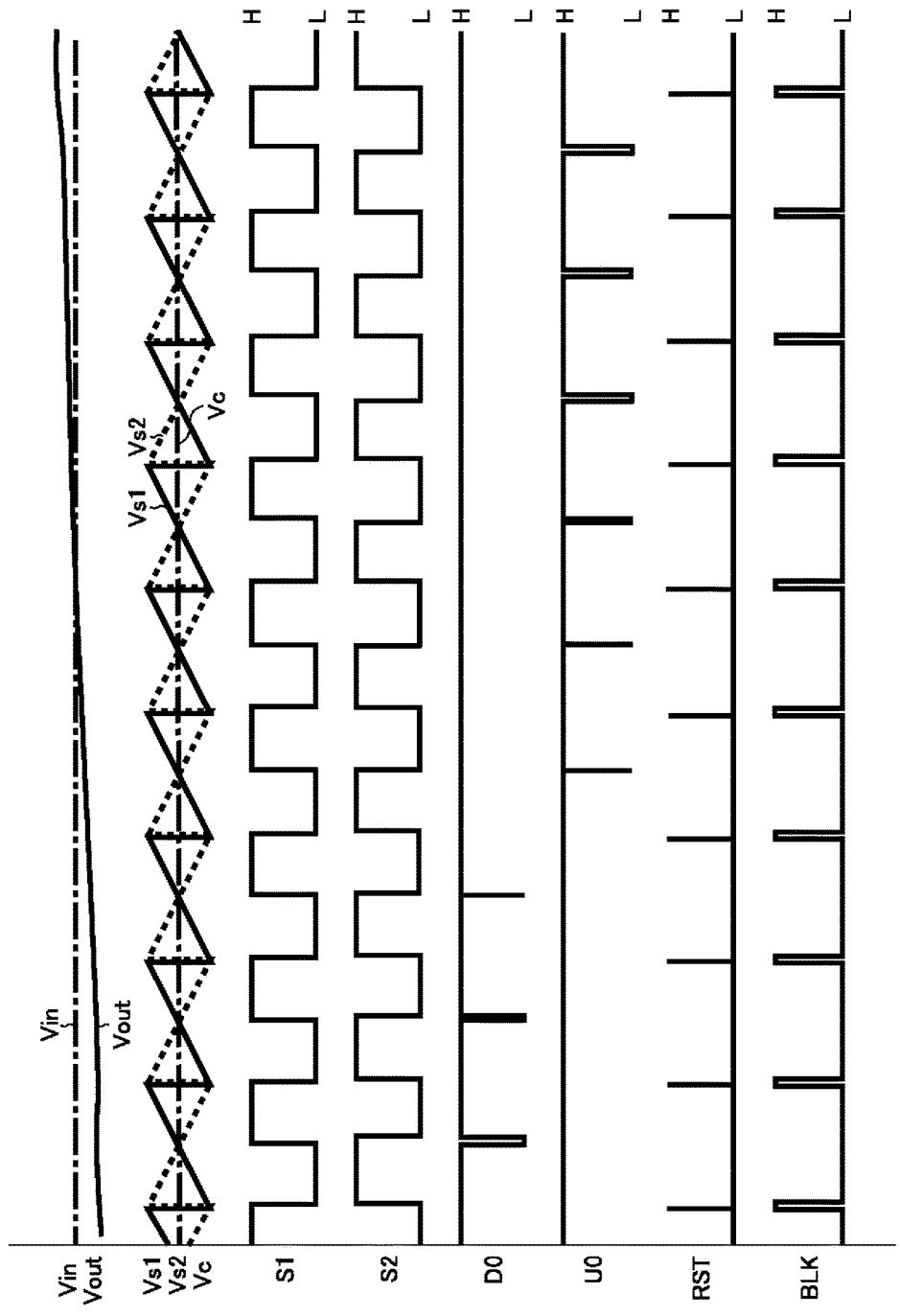
FIG. 16 is a timing chart showing open loop operation (switching operation) in the second embodiment.
Figure 17:
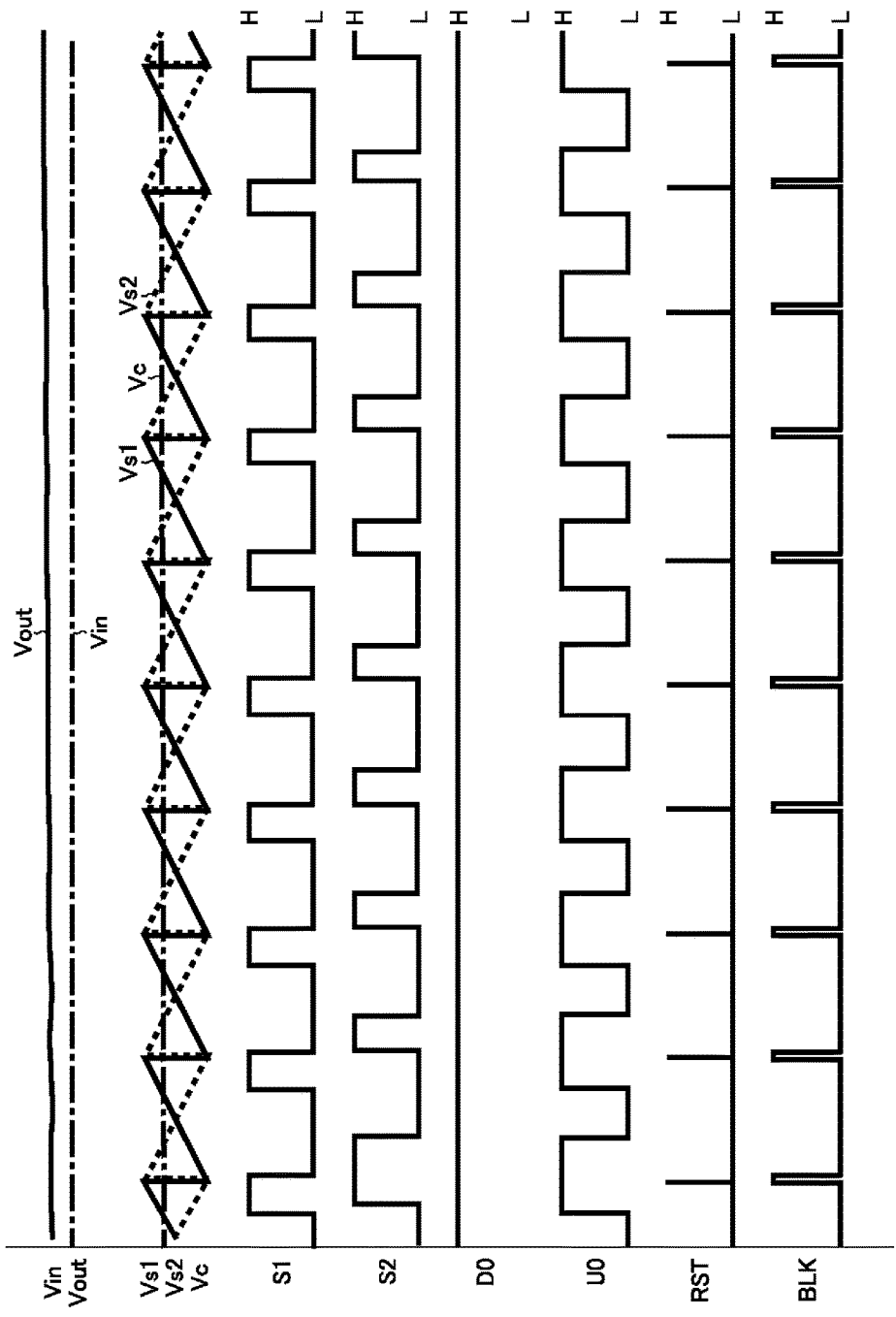
FIG. 17 is a timing chart showing open loop operation (step-up operation) in the second embodiment.

FIGS. 15 to 17 are partly enlarged views corresponding respectively to a region β1 (step-down part), a region β2 (step-up/step-down switch part), and a region β3 (step-up part) in FIG. 14.

As will be understood from FIGS. 14 to 17, as in the above-described first embodiment (FIGS. 7 to 10), as the control voltage Vc is swept, the step-up/step-down DC-DC converter 100 switches seamlessly between step-down operation and step-up operation, and the output voltage Vout monotonically changes.

Also as in the above-described first embodiment, because step-down operation and step-up operation switch with each other at the intersection between the slope voltage Vs1 and the slope voltage Vs2, it is possible to achieve perfect switching without an overlap or a gap between the two types of operation.

When the slope voltages Vs1 and Vs2 are reset (when the capacitor 131c and 131d are discharged), the blank signal BLK is at high level, and the step-down control signal D0 and the step-up control signal U0 are both fixed at high level, resulting in a state where the comparison signals S1 and S2 are not reflected in pulse width modulation control.

That is, in the switching controller 130 according to the second embodiment, by use of the slopes at one side of each of the slope voltages Vs1 and Vs2, the pulse width modulation control is performed on the step-down control signal D0 and the step-up control signal U0.

With this configuration, unlike in the above-described first embodiment, by use of the same slope voltage in every cycle, the pulse widths of the step-down control signal D0 and the step-up control signal U0 can be determined, and thus there is no longer a danger of variation (jitter) occurring in the pulse widths.

Here, as a result of the introduction of masking using the blank signal BLK, a limit is set on the minimum duty factor in step-down operation, and a limit is set on the maximum duty factor in step-up operation. The step-up/step-down DC/DC converter 100 is typically used in a voltage range (for example, see the region β2 in FIG. 14) where step-down operation and step-up operation are switched, and thus the above-mentioned limitations on the duty factor is unlikely to pose a problem.

Figure 18:
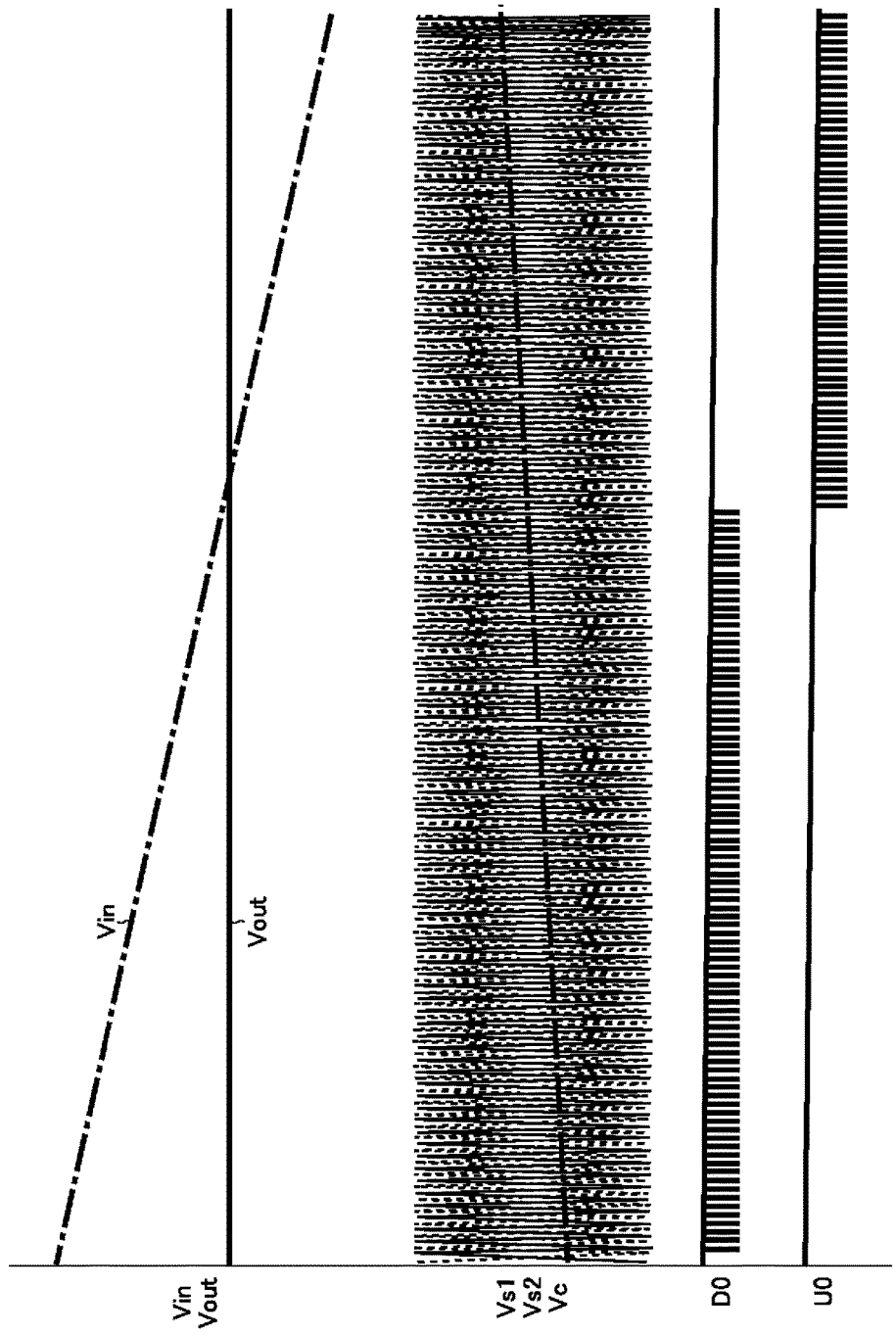
FIG. 18 is a timing chart showing input sweep operation (overall operation) in the second embodiment.

FIG. 18 is a timing chart showing the results of a simulation of input sweep operation in the second embodiment (the behavior observed when the input voltage Vin was swept arbitrarily), depicting, from top down, the input voltage Vin (dash-dot line), the output voltage Vout (solid line), the slope voltage Vs1 (solid line), the slope voltage Vs2 (broken line), the control voltage Vc (dash-dot line), the step-down control signal D0, and the step-up control signal U0.

Through negative feedback control performed according to the control voltage Vc generated in the error amplifier 121, the step-up/step-down DC-DC converter 100 basically operates, on one hand, in a step-down mode (where D0 is pulse-driven while U0 is fixed at high level) when the input voltage Vin is higher than the target value of the output voltage Vout and operates, on the other hand, in a step-up mode (where D0 is fixed at high level while U0 is pulse-driven) when the input voltage Vin is lower than the target value of the output voltage Vout.

For example, as shown in FIG. 18, as the input voltage Vin is swept, the step-up/step-down voltage DC-DC converter 100 switches seamlessly between step-down operation and step-up operation with the output voltage Vout kept at a desired target value.

<Modified Example of the Slope Voltages>

Figure 19:
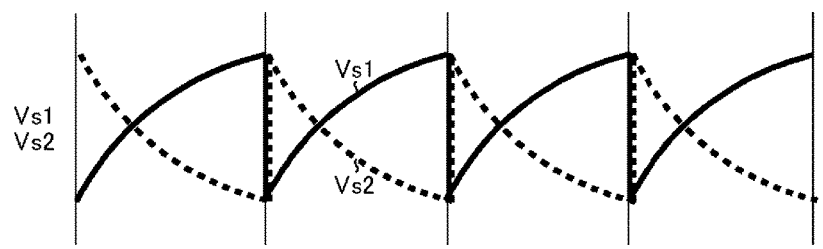
FIG. 19 is a waveform diagram showing a modified example of slope voltages.

FIG. 19 is a waveform diagram showing a modified example of the slope voltages Vs1 and Vs2. The slope voltages Vs1 and Vs2 are not limited to voltage signals having triangular waveforms (first embodiment) or sawtooth waveforms (second embodiment) as previously mentioned as examples; instead, any voltage signals having similar slope waveforms (for example, the RC charging and discharging waveforms shown in FIG. 19) may be used.

<Application to a Television Receiver>

Figure 20:
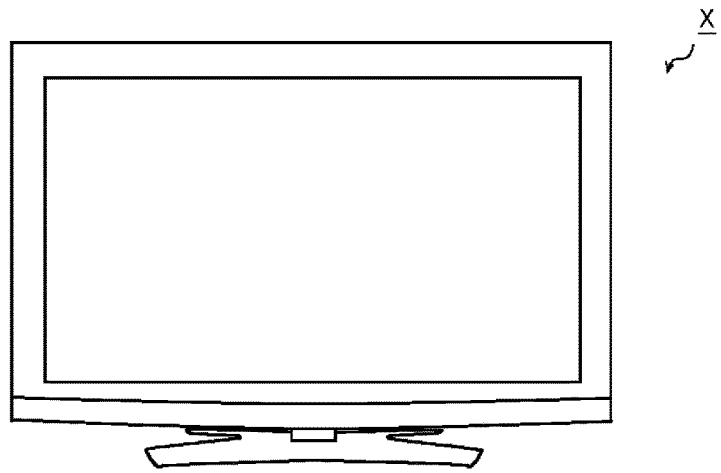
FIG. 20 is an exterior view of a television receiver.

FIG. 20 is an exterior view of a television receiver X. The step-up/step-down DC-DC converter 100 described previously can be suitably used as the power supply of the television receiver X.

<Other Modifications>

Various technical features disclosed herein can be implemented in any manner other than specifically described by way of embodiments above, and allow for many modifications within the spirit of the technical ingenuity involved. That is, it should be understood that the embodiments disclosed herein are in every aspect illustrative and not restrictive, and that the technical scope of the present invention is defined not by the description of embodiments given above but by the scope of the appended claims and encompasses any modification in the sense and scope equivalent to those of the claims.

INDUSTRIAL APPLICABILITY

A step-up/step-down DC-DC converter disclosed herein is suitably applicable, for example, to power supplies for various electronic devices (for example, television receivers).

LIST OF REFERENCE SIGNS 100 step-up/step-down DC-DC converter
110 switching output circuit
111 to 114 switching device
115 coil
116 capacitor
120 control voltage generation circuit
121 error amplifier
122 voltage source
123 to 125 resistor
126 capacitor
130 switching control circuit
131 slope voltage generator
131a, 131b current source
131c, 131d capacitor
131e, 131f discharge switch
131g comparator
131h masking processor
132, 133 comparator
134 logic operator
134a NAND gate
134b OR gate
140 switching drive circuit
X television receiver

The invention claimed is:
1. A switching control circuit comprising:
a slope voltage generator configured to generate a first slope voltage and a second slope voltage that have opposite phases and that cross each other;
a first comparator configured to generate a first comparison signal by comparing the first slope voltage with a control voltage;
a second comparator configured to generate a second comparison signal by comparing the second slope voltage with the control voltage; and
a logic operator configured to generate a step-down control signal and a step-up control signal based on the first comparison signal and the second comparison signal,
wherein the switching control circuit is configured to control switching of a step-up/step-down DC-DC converter by use of the step-down control signal and the step-up control signal,
wherein the first slope voltage and the second slope voltage are both voltage signals having triangular waveforms, sawtooth waveforms, or any other similar slope waveforms, and
wherein the slope voltage generator includes:
a first current source connected between a first power terminal and an output terminal from which the first slope voltage is output;
a first capacitor connected between an output terminal from which the first slope voltage is output and a second power terminal;
a second capacitor connected between a third power terminal and an output terminal from which the second slope voltage is output;

a second current source connected between an output terminal from which the second slope voltage is output and the second power terminal;

a comparator configured to generate a reset signal by comparing the first slope voltage with a voltage applied to the third power terminal;

a first discharge switch configured to discharge the first capacitor according to the reset signal; and a second discharge switch configured to discharge the second capacitor according to the reset signal.

2. The switching control circuit of claim 1, wherein the logic operator is configured to receive the first comparison signal and the second comparison signal, and extract a state where the control voltage is lower than both of the first slope voltage and the second slope voltage and a state where the control voltage is higher than both of the first slope voltage and the second slope voltage, and generate the step-down control signal based on one extraction result and the step-up control signal based on another extraction result.

3. The switching control circuit of claim 1, wherein the logic operator is configured, when the first capacitor and the second capacitor are discharged, to hold logic levels of the step-down control signal and the step-up control signal irrespective of the first comparison signal and the second comparison signal.

4. The switching control circuit of claim 3, wherein the slope voltage generator further includes a masking processor configured to generate a blank signal having a predetermined pulse width when triggered by a pulse edge in the reset signal, and the logic operator is configured to hold the logic levels of the step-down control signal and the step-up control signal according to the blank signal.

5. A step-up/step-down DC-DC converter comprising:

a switching output circuit configured to generate an output voltage from an input voltage by use of a switching device;

a control voltage generation circuit configured to receive the output voltage to generate a control voltage;

the switching control circuit configured to receive the control voltage to generate a step-down control signal and a step-up control signal; and a switching drive circuit configured to receive the step-down control signal and the step-up control signal to drive the switching device, wherein the switching control circuit comprises:

a slope voltage generator configured to generate a first slope voltage and a second slope voltage that have opposite phases and that cross each other;

a first comparator configured to generate a first comparison signal by comparing the first slope voltage with the control voltage;

a second comparator configured to generate a second comparison signal by comparing the second slope voltage with the control voltage; and a logic operator configured to generate the step-down control signal and the step-up control signal based on the first comparison signal and the second comparison signal, wherein the switching control circuit is configured to control switching of the step-up/step-down DC-DC converter by use of the step-down control signal and the step-up control signal, wherein the first slope voltage and the second slope voltage are both voltage signals having triangular waveforms, sawtooth waveforms, or any other similar slope waveforms, and wherein the slope voltage generator includes:

a first current source connected between a first power terminal and an output terminal from which the first slope voltage is output;

a first capacitor connected between an output terminal from which the first slope voltage is output and a second power terminal;

a second capacitor connected between a third power terminal and an output terminal from which the second slope voltage is output;

a second current source connected between an output terminal from which the second slope voltage is output and the second power terminal;

a comparator configured to generate a reset signal by comparing the first slope voltage with a voltage applied to the third power terminal;

a first discharge switch configured to discharge the first capacitor according to the reset signal; and a second discharge switch configured to discharge the second capacitor according to the reset signal.

6. The step-up/step-down DC-DC converter of claim 5, wherein the switching output circuit includes:

a first switching device of which a first terminal is connected to an input terminal to which the input voltage is input;

a second switching device of which a first terminal is connected to a second terminal of the first switching device and of which a second terminal is connected to a ground terminal;

a coil of which a first terminal is connected to a connection node between the second terminal of the first switching device and the first terminal of the second switching device;

a third switching device of which a first terminal is connected to a second terminal of the coil and of which a second terminal is connected to the ground terminal;

a fourth switching device of which a first terminal is connected to the second terminal of the coil and of which a second terminal is connected to an output terminal from which the output voltage is output; and a capacitor of which a first terminal is connected to the output terminal from which the output voltage is output and of which a second terminal is connected to the ground terminal.

7. The step-up/step-down DC-DC converter of claim 5, wherein the control voltage generation circuit includes an error amplifier configured to generate the control voltage according to a difference between the output voltage or a feedback voltage commensurate with the output voltage and a predetermined reference voltage.

8. An electronic device comprising the step-up/step-down DC-DC converter of claim 5.

* * * * *